US010021309B2

(12) United States Patent
Sugawara

(10) Patent No.: US 10,021,309 B2
(45) Date of Patent: Jul. 10, 2018

(54) IMAGE RECORDING APPARATUS AND IMAGE REPRODUCING APPARATUS

(71) Applicant: CANON KABUSHIKI KAISHA, Tokyo (JP)

(72) Inventor: Atsushi Sugawara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/230,761

(22) Filed: Aug. 8, 2016

(65) Prior Publication Data
US 2016/0344940 A1 Nov. 24, 2016

Related U.S. Application Data

(62) Division of application No. 13/912,689, filed on Jun. 7, 2013, now Pat. No. 9,451,148.

(30) Foreign Application Priority Data

Jun. 15, 2012 (JP) .................. 2012-136391

(51) Int. Cl.
H04N 5/232 (2006.01)
G06F 3/0484 (2013.01)

(52) U.S. Cl.
CPC ..... H04N 5/23293 (2013.01); G06F 3/04847 (2013.01); H04N 5/23212 (2013.01)

(58) Field of Classification Search
CPC ........... H04N 5/23212; H04N 5/23229; H04N 13/0011; H04N 13/021; H04N 13/0217;
(Continued)

(56) References Cited

U.S. PATENT DOCUMENTS 7,732,744 B2 6/2010 Utagawa
7,954,067 B2 * 5/2011 Breglio ............... G06F 3/04847
715/810
(Continued)

FOREIGN PATENT DOCUMENTS

CN 101656835 A 2/2010
CN 101800854 A 8/2010
(Continued)

OTHER PUBLICATIONS

Japanese Office Action issued in Japanese Application No. 2016-134931 dated Mar. 14, 2017.
(Continued)

Primary Examiner — Trung Diep
(74) Attorney, Agent, or Firm — Fitzpatrick, Cella, Harper & Scinto

(57) ABSTRACT

An image reproducing includes a memory that stores instructions, and one or more processors that execute the instructions to cause the image reproducing apparatus to function as a generation unit configured to generate an image corresponding to a virtual diaphragm value by reconstructing image data, a setting unit configured to set the virtual diaphragm value, and a display control unit configured to display, on a display, the image corresponding to the virtual diaphragm value generated by the generation unit. The display control unit displays the image corresponding to the virtual diaphragm value and a graphical user interface for indicating the virtual diaphragm value of the image set by the setting unit. In addition, the display control unit displays a plurality of images generated by the generation unit together, and the plurality of images respectively correspond to a plurality of virtual diaphragm values.

17 Claims, 17 Drawing Sheets

(58) Field of Classification Search
CPC ........... H04N 13/0232; H04N 13/0418; H04N 1/0429; H04N 2201/02493; H04N 3/04; H04N 5/2254; H04N 5/23245; G02B 27/0075

See application file for complete search history.

(56) References Cited

U.S. PATENT DOCUMENTS

| | | | | |
|---|---|---|---|---|
| 8,325,241 | B2* | 12/2012 | Yoshioka | H04N 5/2254 348/207.99 |
| 8,345,107 | B2* | 1/2013 | Yumiki | H04N 5/772 348/207.2 |
| 8,502,911 | B2 | 8/2013 | Yamamoto et al. | |
| 8,570,427 | B2 | 10/2013 | Ohnishi et al. | |
| 8,730,377 | B2 | 5/2014 | Matsumoto et al. | |
| 8,749,620 | B1 | 6/2014 | Knight et al. | |
| 9,313,397 | B2* | 4/2016 | Harris | H04N 5/2355 |
| 2004/0008258 | A1 | 1/2004 | Aas et al. | |
| 2010/0129048 | A1 | 5/2010 | Pitts et al. | |
| 2010/0141802 | A1 | 6/2010 | Knight et al. | |
| 2010/0289925 | A1* | 11/2010 | Koshikawa | H04N 5/772 348/239 |
| 2010/0309364 | A1 | 12/2010 | Brunner et al. | |
| 2011/0109751 | A1 | 5/2011 | Chang et al. | |
| 2012/0027393 | A1 | 2/2012 | Tsuda et al. | |
| 2013/0009989 | A1 | 1/2013 | Chen et al. | |
| 2013/0076930 | A1 | 3/2013 | Border et al. | |
| 2016/0173869 | A1* | 6/2016 | Wang | G06T 5/50 348/187 |

FOREIGN PATENT DOCUMENTS

| | | | |
|---|---|---|---|
| JP | 2003-087545 | A | 3/2003 |
| JP | 2004-179868 | A | 6/2004 |
| JP | 2004-289383 | A | 10/2004 |
| JP | 2007-004471 | A | 1/2007 |
| JP | 2008-109551 | A | 5/2008 |
| JP | 2010-177860 | A | 8/2010 |
| JP | 2011-022796 | A | 2/2011 |
| JP | 2011-048341 | A | 3/2011 |
| JP | 2012-027408 | A | 2/2012 |
| JP | 2012-049628 | A | 3/2012 |
| JP | 2013-110556 | A | 6/2013 |

OTHER PUBLICATIONS

Mar. 1, 2016 Chinese Office Action corresponding to Chinese Patent Application No. 201310239486.X.
R. Ng, et al., "Light Field Photography with a Hand-Held Plenpotic Camera", Stanford Tech Report CTSR Feb. 2005 (2005).
Office Action dated Aug. 31, 2017, in Japanese Patent Application No. 2016-134931.

* cited by examiner

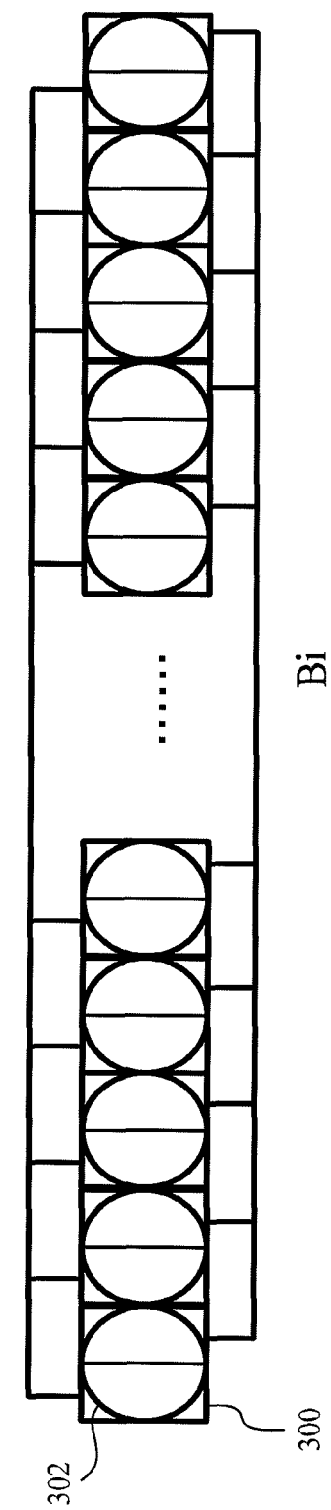

FIG. 9C

| dbb | dbb | dbb | dbb | dbb | d11 | d11 |
|-----|-----|-----|-----|-----|-----|-----|
| dbb | dbb | dbb | dbb | dbb | d11 | d11 |
| dbb | dbb | dbb | dbb | dbb | d11 | d11 |
| dbb | dbb | 0 | 0 | 0 | dbb | dbb |
| dbb | dbb | 0 | 0 | 0 | dbb | dbb |
| d33 | d33 | dbb | dbb | dbb | dbb | dbb |
| d33 | d33 | dbb | dbb | dbb | dbb | dbb |
| d33 | d33 | dbb | dbb | dbb | dbb | dbb |
| dbb | dbb | dbb | dbb | dbb | dbb | dbb |

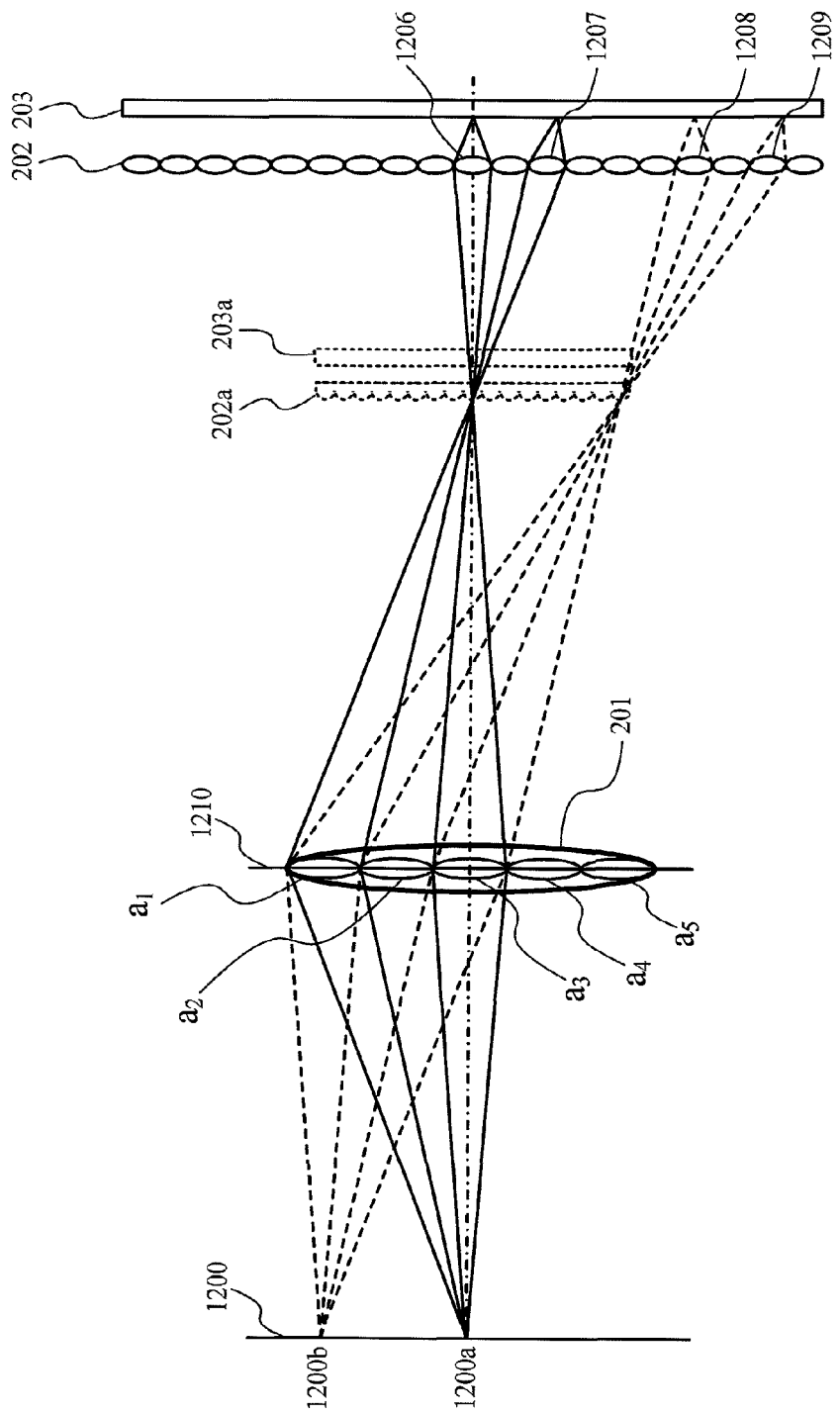

IMAGE RECORDING APPARATUS AND IMAGE REPRODUCING APPARATUS

This application is a divisional of pending Application Ser. No. 13/912,689 filed Jun. 7, 2013, which has been allowed.

BACKGROUND OF THE INVENTION

Field of the Invention

The present invention relates to an image pickup apparatus represented by a digital camera and, more particularly, to a recording apparatus of an image, which is photographed by an image pickup apparatus having a refocus function and a reproducing apparatus of the recorded image.

Description of the Related Art

In recent years, an image pickup apparatus arranged such that a microlens array, including microlenses arranged at one to a plurality of pixels, is arranged in front of an image pickup element, so that information of incidence directions of rays of light incident on the image pickup element can be obtained in addition to pixel signals, has been proposed in non-patent literature (Ren. Ng and seven others, "Light Field Photography with a Hand-Held Planoptic Camera", Stanford Tech Report CTSR 2005-02) and the like. By using such an image pickup apparatus, not only can a normal photographed image based on output signals from respective pixels be generated, but also, an image which is focused at an arbitrary focal length can be reconstructed by predetermined image processing that is applied to a photographed image.

When such an image that can be refocused is displayed for the purpose of browsing, it is difficult to judge at which focus position an image to be displayed first is to be refocused. In order to solve this problem, the device described in Japanese Patent Application Laid-Open No. 2011-22796 extracts an object from an image, and displays a refocus image in which an area including that object is focused. Alternatively, image pickup conditions at the time of image capture are appended as tag data to image data, and a refocus image is generated based on that tag information.

However, the related art disclosed in the above patent literature requires processing for extracting an object before an image is displayed. Even in a case where information at the time of photographing is included as tag data, a phase difference between a plurality of images of different view points has to be calculated so as to determine a refocus plane after reconstruction, thus unwantedly generating arithmetic cost in either case.

SUMMARY OF THE INVENTION

An aspect of the present invention is to provide a recording apparatus and reproducing apparatus of image data, which can quickly display image data obtained by an image pickup apparatus that can photograph an object as an image that can be refocused, as a desired refocus image.

In order to solve the above-described problem, according to the invention, an image recording apparatus for recording image data from which a refocus image of an image including at least one object can be reconstructed, comprises: an obtaining unit configured to obtain image data which is obtained by photographing the image including at least one object and can reconstruct the refocus image, and photographing information of the image; a parameter generation unit configured to generate a parameter to be used to reconstruct the refocus image based on the obtained photographing information in relation to the object included in the image; and a recording unit configured to record the generated parameter as meta data of the image in a recording medium together with the obtained image data.

Furthermore, according to the present invention, an image reproducing apparatus for reproducing the image data recorded by the image recording apparatus, comprises: a read unit configured to read out the recorded image data and the parameter from the recording medium; a reconstruction unit configured to reconstruct a refocus image from the readout image data using the readout parameter; and an editing unit configured to edit the reconstructed refocus image according to an editing instruction, and to edit a parameter of the edited refocus image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B are views illustrating focus detection using outputs from the image pickup element and generation of signals required to detect a refocus plane.

FIGS. 9A, 9B, and 9C are conceptual views showing an image including a plurality of objects located at different distances and a defocus map of that image.

FIGS. 12A, 12B, and 12C are conceptual views showing other optical systems applicable to an embodiment of the present invention.

DESCRIPTION OF THE EMBODIMENTS

Exemplary embodiments of the present invention will now be described in detail in accordance with the accompanying drawings.

First Embodiment

Figure 2:
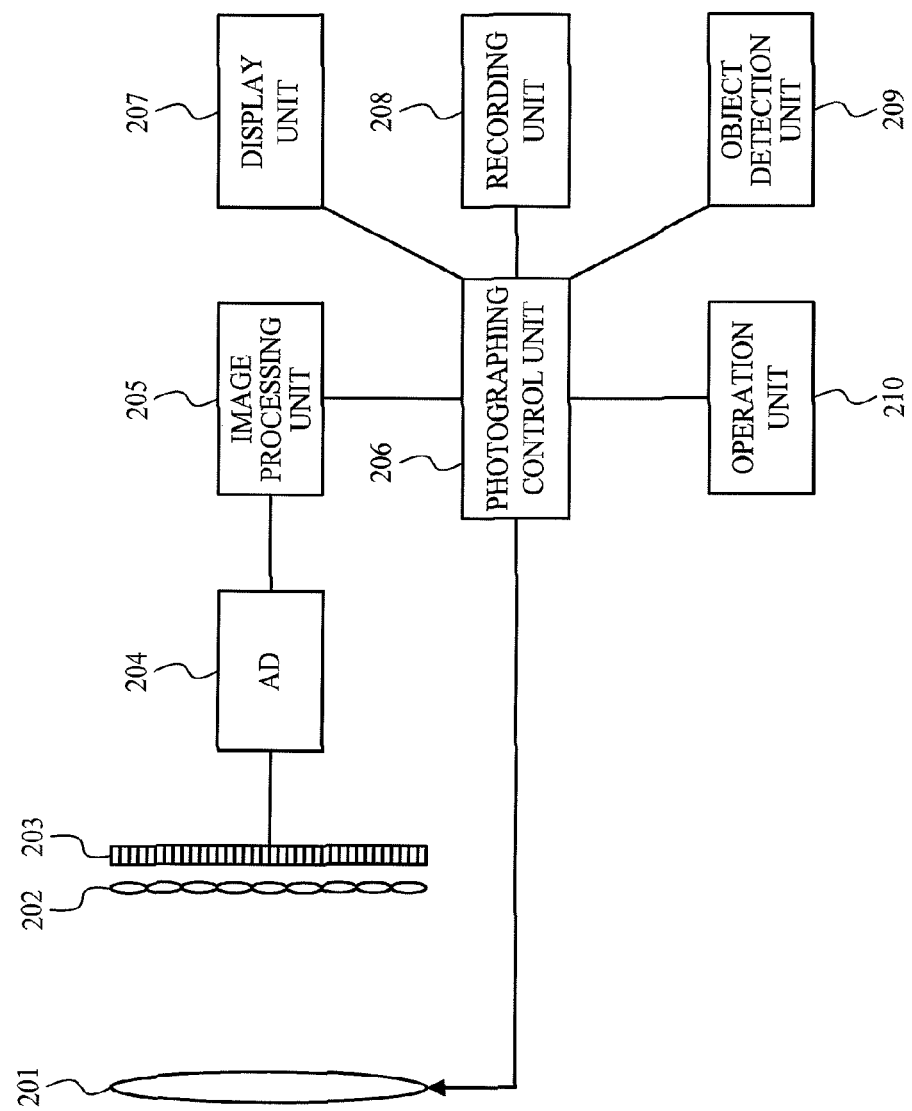
FIG. 2 is a block diagram showing the arrangement of an image pickup apparatus to which a recording apparatus according to the first embodiment of the present invention is applied.

FIG. 2 is a block diagram of a digital camera as an image pickup apparatus to which an image recording apparatus according to the first embodiment of the present invention is applied. Reference numeral 201 denotes a photographing lens, which includes a plurality of lenses although not shown. The plurality of lenses includes a movable focus lens, and a focus state with respect to an object can be adjusted by moving the focus lens. Reference numeral 202 denotes a microlens array (to be abbreviated as an MLA hereinafter), which includes a plurality of microlenses, and is arranged in the neighborhood of the focal point of the photographing lens 201. Rays of light passing through different pupil areas of the photographing lens 201 are incident on the MLA 202, and exit separately from the microlenses for every pupil division area. Reference numeral 203 denotes an image pickup element, which includes a CCD, CMOS image sensor, or the like, and is arranged in the neighborhood of the focal point of the MLA 202. Details of the MLA 202 and image pickup element 203 will be described later.

Reference numeral 204 denotes an AD converter, which AD-converts an image signal output from the image pickup element 203 into digital data. An image processing unit 205 applies predetermined image processing and the like to that digital data, thus obtaining digital image data of an object. Reference numeral 206 denotes a photographing control unit, which controls to display digital image data obtained by the image processing unit 205 on a display unit 207 including a liquid crystal display or the like, and to store the digital image data in a recording unit 208. The photographing control unit 206 controls respective units when its CPU loads and executes a program stored in a memory (not shown). In this case, all or some of functions of the respective units may be implemented by the CPU or by hardware.

Reference numeral 209 denotes an object detection unit, which detects a face of a person from digital image data obtained by the image processing unit 205, and detects a position and size of the face in its frame. An operation unit 210 includes buttons, a touch panel, and the like, which accept operations from the user, and performs various operations such as start of a focusing operation, and reproduction and deletion of digital image data stored in the recording unit 208 according to the accepted operations. The photographing lens 201 is electrically and mechanically connected to the photographing control unit 206, which can obtain information of the photographing lens via communications, and can send a driving command and the like of the focus lens in case of a focusing operation.

The arrangement of the photographing lens 201, MLA 202, and image pickup element 203 in the image pickup apparatus shown in FIG. 2 will be described below.

Figure 3:
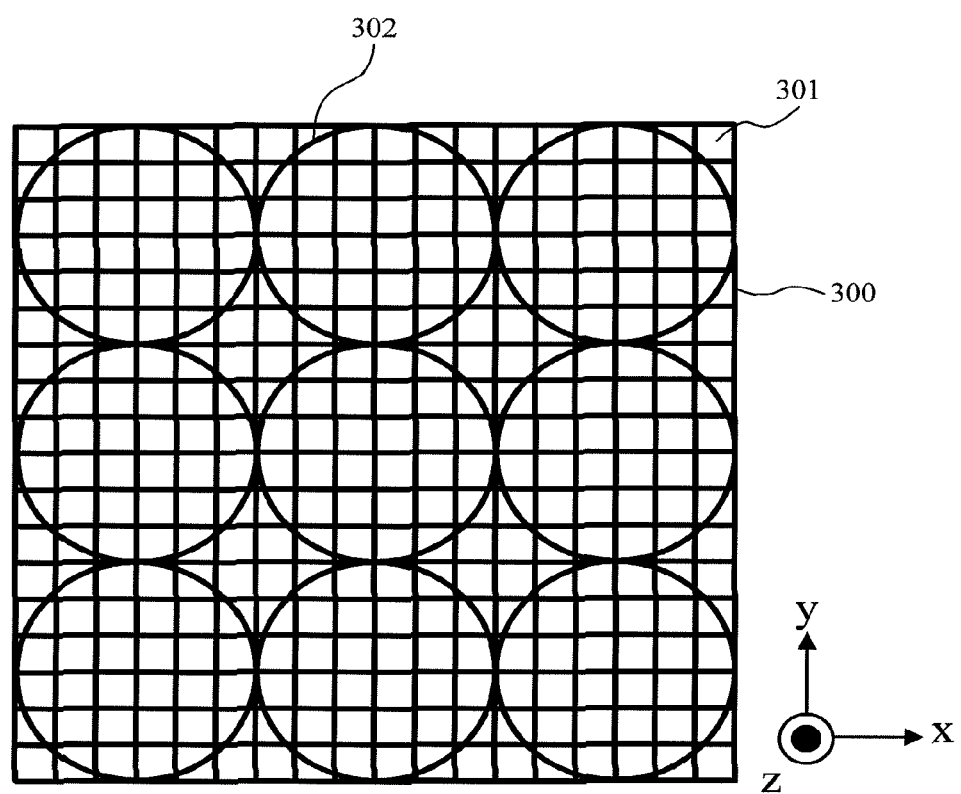
FIG. 3 is a view illustrating the arrangement of an image pickup element and microlens array used in the image pickup apparatus shown in FIG. 2.

FIG. 3 is a view for explaining the arrangement of the image pickup element 203 and MLA 202. FIG. 3 shows the image pickup element 203 and MLA 202 when viewing from a z-direction parallel to an optical axis of the photographing lens 201. One microlens 302 is arranged in correspondence with a plurality of unit pixels 301 (photoelectric conversion elements) which form a virtual pixel 300 of a photographed image. The microlens 302 is one of those which form the MLA 202. FIG. 3 illustrates that a total of 25 (=5 rows×5 columns) unit pixels 301 correspond to one microlens. Coordinate axes appended to FIG. 3 define an optical axis direction as a z-axis, a plane perpendicular to the z-axis as a plane parallel to an image pickup plane, and an x-axis (horizontal direction) and y-axis (vertical direction) in the image pickup plane. Note that FIG. 3 partially shows a light-receiving surface of the image pickup element 203, and a considerable number of pixels are arranged on an actual image pickup element.

Figure 4:
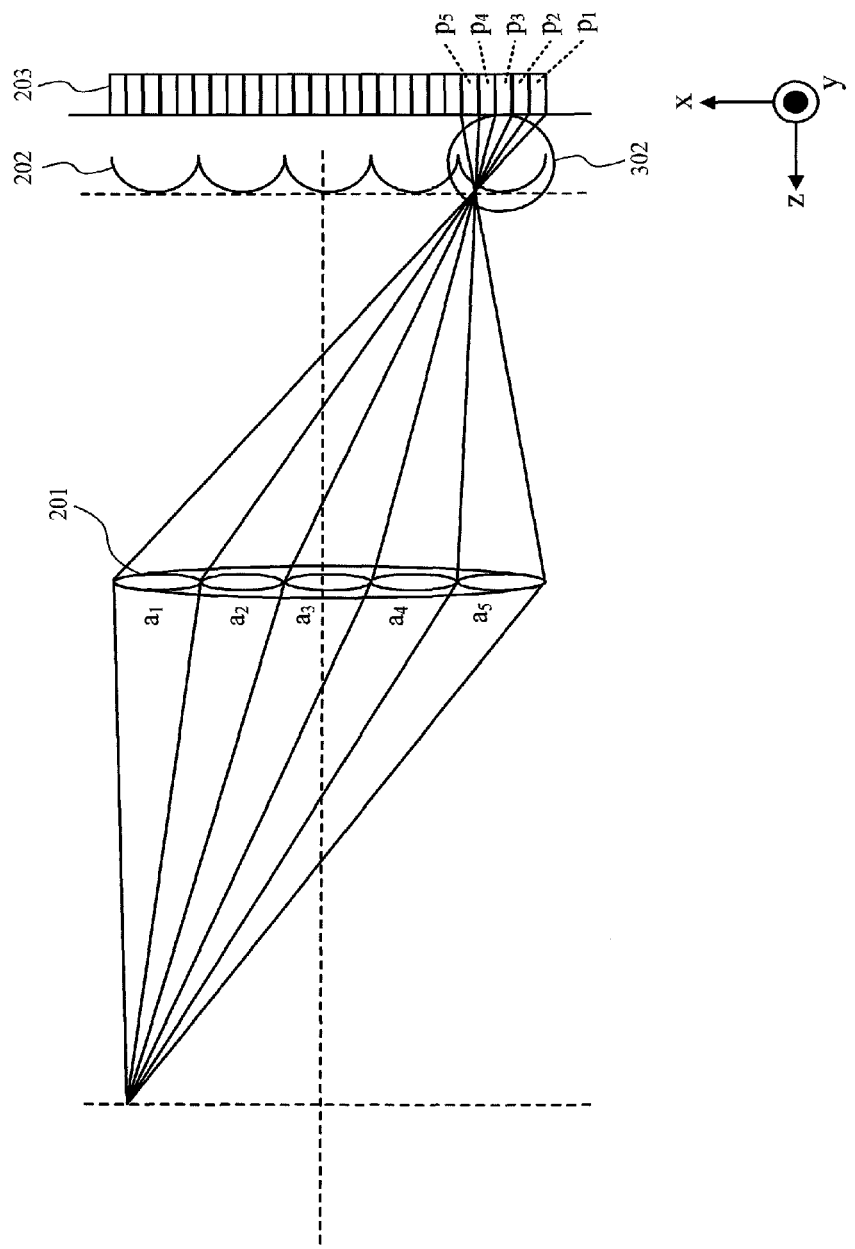
FIG. 4 is a conceptual view showing the arrangement of a photographing optical system including a photographing lens, microlens array, and image pickup element in the image pickup apparatus shown in FIG. 2.

FIG. 4 shows a state in which light exiting from the photographing lens 201 passes through one microlens 302 and is received by the image pickup element 203 when viewing from a direction perpendicular to an optical axis z. Rays of light exiting from respective pupil areas $a_1$ to $a_5$ of the photographing lens 201 and then passing through the microlens 302 are focused onto corresponding unit pixels $p_1$ to $p_5$ of the image pickup element 203.

Figure 5A:
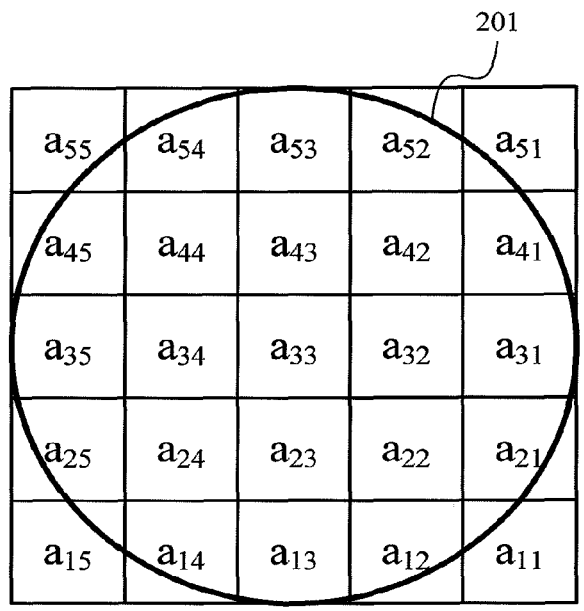
FIGS. 5A and 5B are views showing a correspondence relationship between a pupil area of the photographing lens of the image pickup apparatus shown in FIG. 2 and pixels of the image pickup element shown in FIG. 3.
Figure 5B:
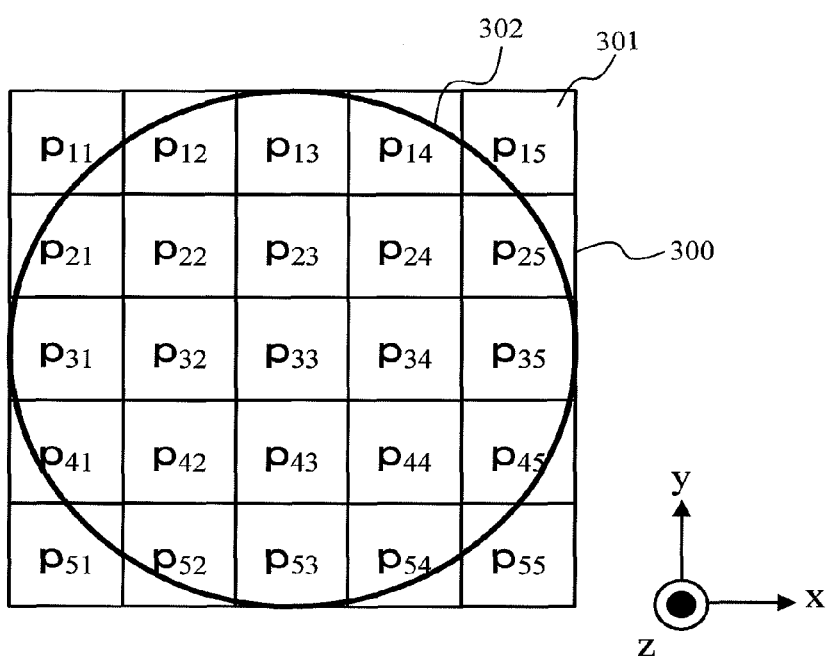

FIG. 5A shows an aperture of the photographing lens 201 when viewing from the optical axis (z-axis) direction. FIG. 5B shows one microlens 302 and the unit pixel 300 arranged behind that microlens when viewing from the optical axis (z-axis) direction. As shown in FIG. 5A, when a pupil area of the photographing lens 201 is divided into as many areas as pixels located under one microlens, light coming from one pupil division area of the photographing lens 201 is focused onto one pixel. Assume that f-numbers of the photographing lens 201 and the microlens 302 nearly match in this case. Letting a11 to a55 be pupil division areas of the photographing lens 201 shown in FIG. 5A, and letting p11 to p55 be pixels shown in FIG. 5B, their correspondence relationship is point-symmetric when viewed from the optical axis (z-axis) direction. Therefore, light exiting from the pupil division area a11 of the photographing lens 102 is focused onto the pixel p11 of the pixels 301 located behind the microlens 302. Likewise, light exiting from the pupil division area a11 and then passing through another microlens is focused onto the pixel p11 of the pixels 301 located behind that microlens.

Figure 6A:
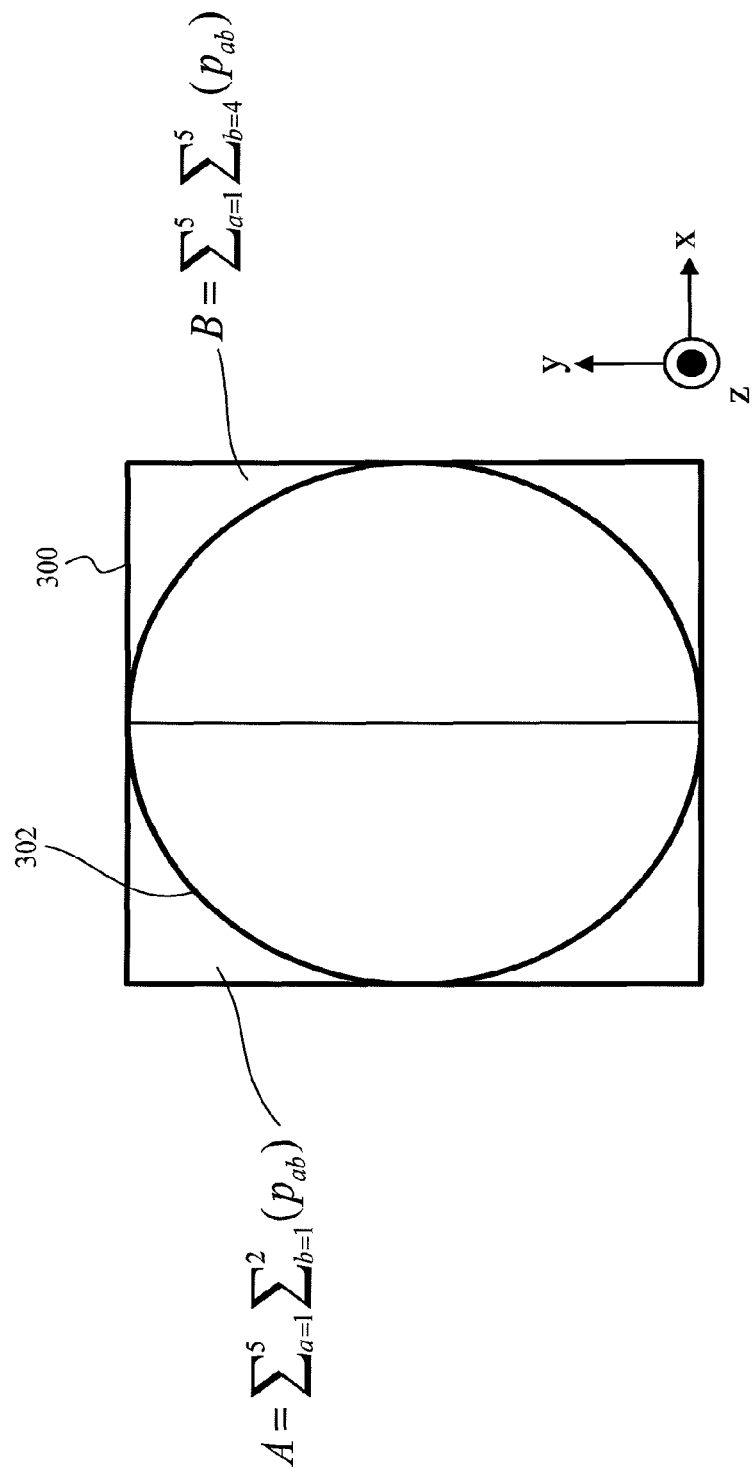

As described above, since the pixels p11 to p55 shown in FIG. 5B receive rays of light passing through different pupil areas with respect to the photographing lens 201, a focus detection operation can be executed using outputs from these pixels. As shown in FIG. 6A, pixel outputs p11 to p55 corresponding to respective microlenses are added to generate two signals, which are pupil-divided in the horizontal direction, as given by:

$$A = \sum_{a=1}^{5} \sum_{b=1}^{2} (P_{ab}) \quad (1)$$

$$B = \sum_{a=1}^{5} \sum_{b=4}^{5} (P_{ab}) \quad (2)$$

A combined signal A given by equation (1) views rays of light passing through areas a1 and a2 of an exit pupil of the photographing lens 201, as shown in FIG. 4. When combined signals A1 to An obtained from pixels corresponding to n microlenses, which are continuously arranged in the horizontal direction, are arranged, as shown in FIG. 6B, a one-dimensional image signal Ai (i=1, 2, 3, . . . , n) is obtained. Likewise, when a one-dimensional image signal Bi (i=1, 2, 3, . . . , n) obtained by arranging combined signals B each calculated by equation (2) is also, generated, the signals Ai and Bi are those as viewed from right and left sides of the exit pupil, respectively, of the photographing lens 201. For this reason, relative positions of the signals Ai and Bi are detected, and a focus detection operation based on a phase difference detection method can be executed according to a result obtained by multiplying their relative shift amount by a predetermined conversion coefficient. By generating the signals Ai and Bi at an arbitrary position in a frame, since a focus position at that position can be calculated, the focus lens is driven in accordance with the calculation result, thus attaining automatic focus adjustment.

Figure 7:
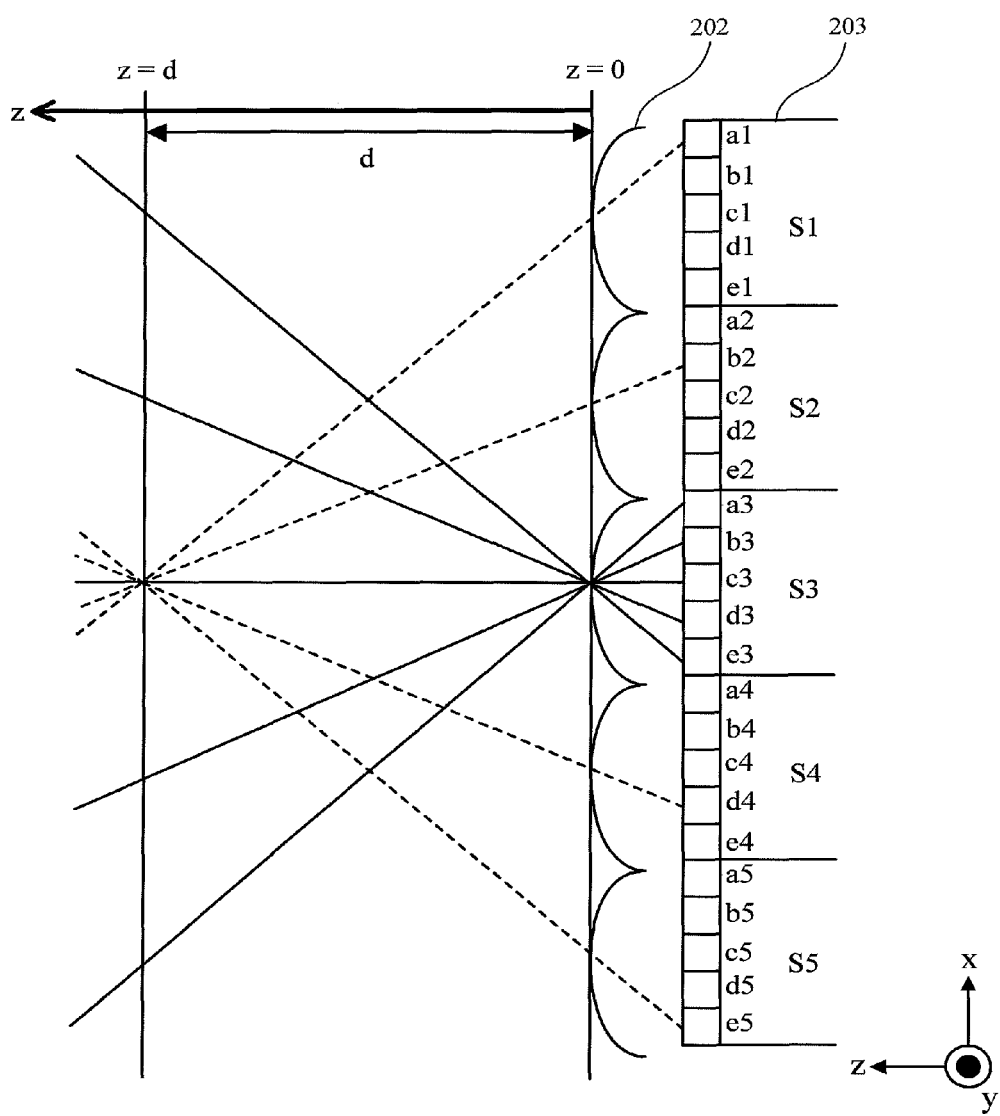
FIG. 7 is a view showing the relationship between rays of light from different refocus planes and corresponding light-receiving pixels.

Next, processing for reconstructing digital image data obtained by the photographing lens 201, MLA 202, and image pickup element 203 into an image at an arbitrarily set in-focus position (refocus plane) will be described below. FIG. 7 shows states of rays of light when a designated refocus plane is at z=0 and at z=d. In consideration of central pixels in FIG. 7, when z=0, rays of light exiting from the microlens are respectively incident on pixels a3, b3, c3, d3, and e3. Therefore, S3 can be calculated as an output of a virtual pixel, as given by the following equation:

$$S3 = a3 + b3 + c3 + d3 + e3 \quad (3)$$

The same applies to pixels such as S1 other than S3.

When an image obtained by stopping down an iris of the lens is to be reconstructed, since light of only an area in the neighborhood of the center of the photographing lens 201 according to an iris value need only be used, S3 is given by:

$$S3 = b3 + c3 + d3 \quad (4)$$

A reconstruction image at z=0 when the iris is stopped down compared to the image given by equation (3) can be obtained. In this case, S3 is given by:

$$S3 = c3 \quad (5)$$

An image at z=0 when the iris is further stopped down can be reconstructed. That is, an image in a stopping-down direction can be reconstructed.

Note that only five pixels arranged in an x-direction have been exemplified for the descriptive convenience. However since pixels are arranged on an x-y plane, the same idea applies two-dimensionally. For example, S3 when the iris is open is given by the sum of 25 pixel outputs.

On the other hand, when z=d, since rays of light exiting from a plane at z=d are respectively incident on pixels a1, b2, c3, d4, and e5, S3 can be generated, as given by:

$$S3 = a1 + b2 + c3 + d4 + e5 \quad (6)$$

In this manner, when a position z (refocus position) of a refocus plane and an iris value F at the time of reconstruction are determined, a reconstruction image can be calculated. When this equation (6) is applied to other reconstructed pixels other than S3, a reconstruction image when z=d can be calculated by the following matrix calculations:

$$\begin{bmatrix} \vdots \\ S1 \\ S2 \\ S3 \\ S4 \\ S5 \\ \vdots \end{bmatrix} = \begin{bmatrix} \cdots & & & & & & \cdots \\ ..00100 & 00010 & 00001 & 00000 & 00000.. \\ ..01000 & 00100 & 00010 & 00001 & 00000.. \\ ..10000 & 01000 & 00100 & 00010 & 00001.. \\ ..00000 & 10000 & 01000 & 00100 & 00010.. \\ ..00000 & 00000 & 10000 & 01000 & 00100.. \\ \cdots & & & & & & \cdots \end{bmatrix} \begin{bmatrix} \vdots \\ a1 \\ b1 \\ c1 \\ d1 \\ e1 \\ a2 \\ b2 \\ c2 \\ d2 \\ e2 \\ a3 \\ b3 \\ c3 \\ d3 \\ e3 \\ a4 \\ b4 \\ c4 \\ d4 \\ e4 \\ a5 \\ b5 \\ c5 \\ d5 \\ e5 \\ \vdots \end{bmatrix} \quad (7)$$

That is, equation (7) means that if the position z of the refocus plane of a reconstruction image and the iris value F at the time of reconstruction are determined, the reconstruction image can be easily obtained by multiplying a matrix of all pixel outputs by M if the following conversion matrix M is provided in advance:

$$M = \begin{bmatrix} \cdots & \cdots & \cdots & \cdots & \cdots & \cdots \\ \cdots & 0\,0\,1\,0\,0 & 0\,0\,0\,1\,0 & 0\,0\,0\,0\,1 & 0\,0\,0\,0\,0 & 0\,0\,0\,0\,0 & \cdots \\ \cdots & 0\,1\,0\,0\,0 & 0\,0\,1\,0\,0 & 0\,0\,0\,1\,0 & 0\,0\,0\,0\,1 & 0\,0\,0\,0\,0 & \cdots \\ \cdots & 1\,0\,0\,0\,0 & 0\,1\,0\,0\,0 & 0\,0\,1\,0\,0 & 0\,0\,0\,1\,0 & 0\,0\,0\,0\,1 & \cdots \\ \cdots & 0\,0\,0\,0\,0 & 1\,0\,0\,0\,0 & 0\,1\,0\,0\,0 & 0\,0\,1\,0\,0 & 0\,0\,0\,1\,0 & \cdots \\ \cdots & 0\,0\,0\,0\,0 & 0\,0\,0\,0\,0 & 1\,0\,0\,0\,0 & 0\,1\,0\,0\,0 & 0\,0\,1\,0\,0 & \cdots \\ \cdots & \cdots & \cdots & \cdots & \cdots & \cdots \end{bmatrix} \quad (8)$$

Figure 8:
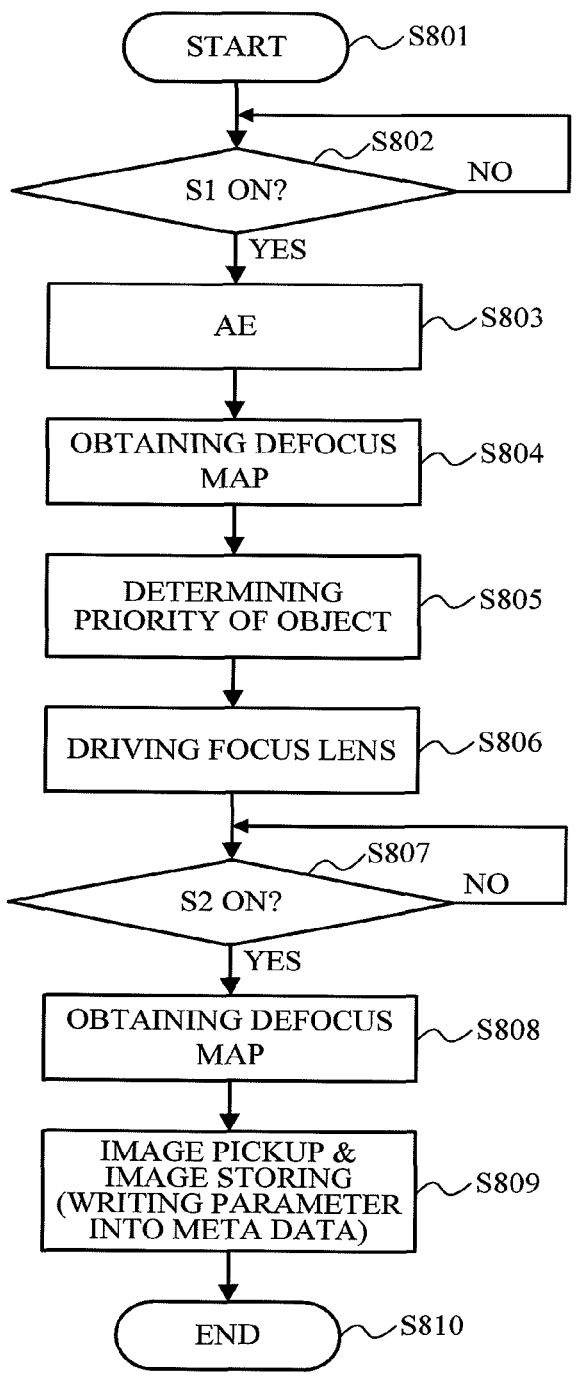
FIG. 8 is a flowchart of a recording operation according to the first embodiment of the present invention.

A recording operation of this embodiment will be described below using the flowchart shown in FIG. 8. In this embodiment, this operation is executed under the control of the photographing control unit 206 of the camera. After a camera operation is started in step S801, the control waits until the user turns on a switch S1 as a pre-photographing preparation in step S802. The pre-photographing preparation includes AE/AF operations, and when the user operates an operation member included in the operation unit 210, the switch S1 is turned on. In this case, when the user half-depresses a two-step push button switch, the switch S1 is turned on. When he or she full-depresses that switch, a switch S2 is turned on. If the switch S1 is turned on, the process advances to step S803.

In steps S803 to S806, AE/AF operations as the pre-photographing preparation are executed. In step S803, an AE operation is executed. In the AE operation, an exposure level of an image is evaluated from output signal levels of the image pickup element 203 obtained under a predetermined condition, so as to determine an exposure condition which can prevent the occurrence of saturation and blocked up shadows of output signals as much as possible. Note that, as has already been described above, since a reconstruction image in a direction of an increasing iris value (stopping-down direction) can be calculated according to equations (3) to (5), it is desirable to make a photographing operation under a condition in which the iris is opened as large as possible.

Figure 9A:
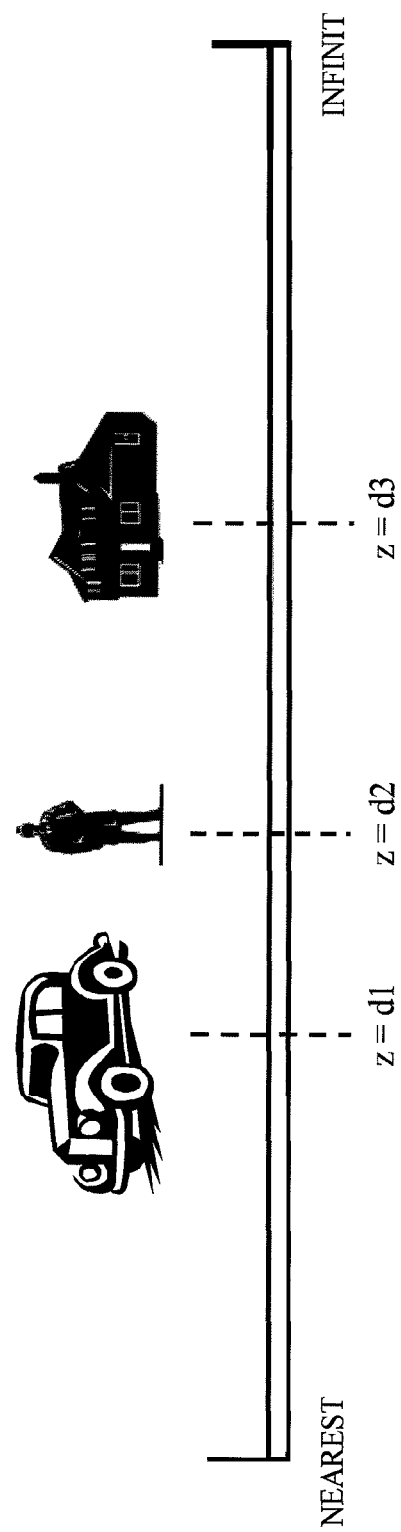

In steps S804 to S806, the AF operation is executed. As has already been described using FIGS. 6A and 6B, the camera shown in FIG. 2 can calculate a focus position at an arbitrary position in a frame. Hence, for example, when focus positions are detected for objects including a building, a person, and a vehicle which are distributed at different distances, as shown in FIG. 9A, while dividing a frame into 63 (=9 (horizontal direction) ×7 (vertical direction)) blocks, a defocus map shown in FIG. 9B can be obtained. Note that, in FIG. 9B, a defocus amount of a portion corresponding to a background in the frame is indicated by db. In step S804, the defocus map is obtained in this way.

By grouping blocks having close defocus amount values for such a defocus map, the number of objects can be roughly estimated. When the object detection unit 209 detects the presence of a face of a person in the frame, the position of the person can be detected. Therefore, as can be seen from the example shown in FIGS. 9A to 9C, three objects are located at positions approximately corresponding to defocus amounts=d1, d2, and d3, and the object at the position d2 is a person. Hence, this embodiment determines priorities for the object according to the following rules:

Priority 1: a face (when a plurality of faces are included, higher priorities are determined in descending order of size of the detected faces)

Figure 9B:
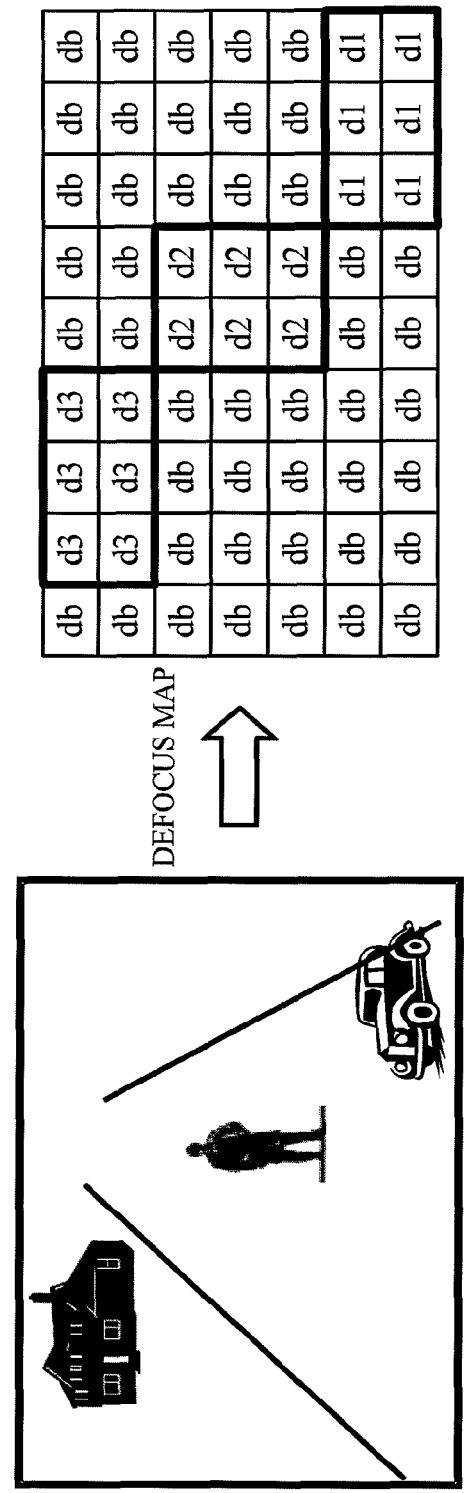

Priority 2: higher priorities are determined for objects other than a face in an order of the defocus amount from nearest to infinite Upon application of these rules, in the example shown in FIGS. 9A to 9C, a person having the defocus amount=d2 is set as an object with highest priority, a vehicle having the defocus amount=d1, which is not a face but is located at the nearest side, is set as an object with second highest priority, and a building having the defocus amount=d3 is set as an object with third highest priority. In step S805, objects are specified from the defocus map, and priorities are set for the specified objects in this way. Note that this embodiment adopts the priority determination rules which prioritize a face of a person. However, these rules are a mere example, and the present embodiment is not limited to them. Alternatively, in place of or in preference to the priority determination rules, priorities may be manually determined using a switch or the like.

In step S806, in order to focus the person determined to have the highest priority by the priority determination, the focus lens is driven by the defocus amount=d2, thus completing the AF operation. Then, the control waits until the user turns on the switch S2 in step S807. If the user turns on the switch S2, operations from step S808 including a photographing operation are executed.

In step S808, an operation for obtaining a defocus map (photographing information) again immediately before the photographing operation is executed. Since the focus lens is driven to focus the person in step S806, when the defocus map is obtained at this timing, the defocus amount of the person portion becomes 0, as shown in FIG. 9C, and the defocus amounts of the vehicle portion and building portion are respectively changed to d11 and d33. Note that a defocus amount of a portion corresponding to a background in the frame is indicated by dbb in FIG. 9C.

Figure 1:
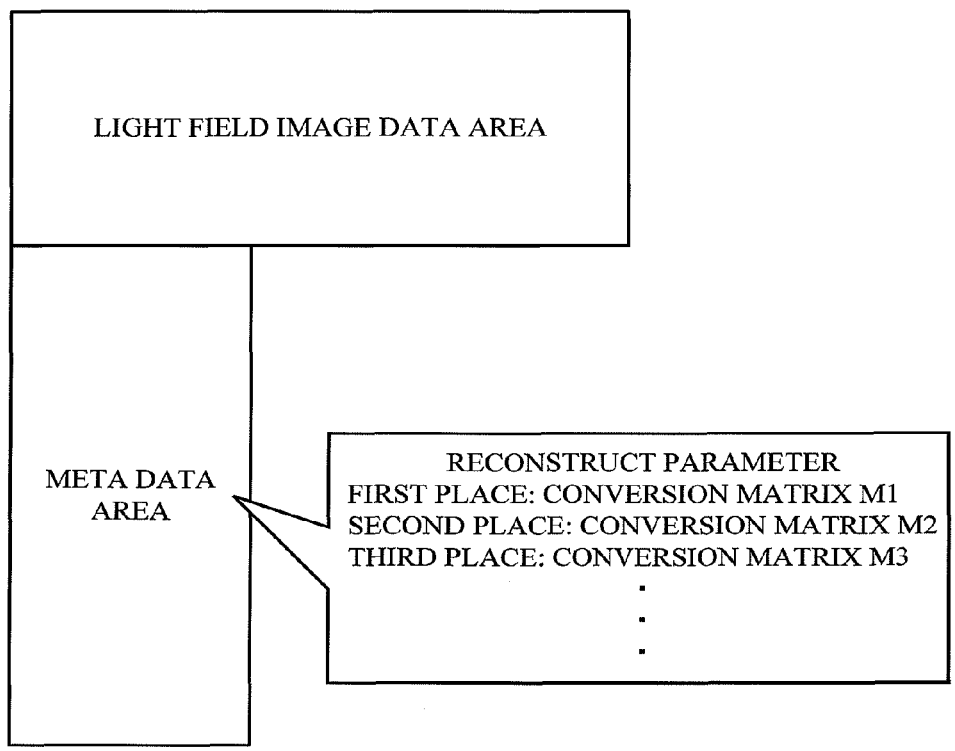
FIG. 1 is a view showing the configuration of image data having reconstruction parameters in meta data.

After the defocus amounts of the respective objects are obtained, an image pickup operation is finally performed in step S809, and parameters required to obtain reconstruction images, which are focused on the respective objects, are generated and appended to the image pickup data as meta data. Assume that, as for iris values of the reconstruction images, since an iris value in the stopping-down direction can be changed later by the user, an iris value (photographing information) of parameters to be recorded at the time of photographing completion is F at the time of photographing. Also, conversion matrices M which can generate images focused on respective objects in a priority order determined in step S805 are appended to the photographed image. That is, a conversion matrix M1 (that is required to generate a reconstruction image having a defocus amount=0 and iris value=F), which can reconstruct an image in which an object person is focused, is appended as the first place of the priority. The second place is a conversion matrix M2 (that is required to generate a reconstruction image having a defocus amount=d11 and iris value=F) which can reconstruct an image in which an object vehicle is focused. The third place is a conversion matrix M3 (that is required to generate a reconstruction image having a defocus amount=d33 and iris value=F) which can reconstruct an image in which an object building is focused. As a result, these conversion matrices are appended as meta data of an image, as shown in FIG. 1. Note that since each conversion matrix has a relatively large data size, only a position of a refocus plane (defocus amount) and iris value may be stored in meta data in a priority order. In this case, the defocus amount=0 and iris value=F for the first place, the defocus amount=d11 and iris value=F for the second place, and the defocus amount=d33 and iris value=F for the third place are appended to an image as parameters. After the photographed image data and the meta data required for refocusing, which is generated in association with the objects, as described above, are recorded, the photographing operation ends.

The recording apparatus of the present invention has been described taking, as an example, the image pickup apparatus as a digital camera. However, the present invention is not limited to this. For example, an arrangement in which image data and meta data are externally output from a camera and are recorded may be adopted. Also, an arrangement in which only image data and information for meta data are stored in a detachable-type recording medium at a time of photographing, and a processing apparatus such as a PC records the image data and meta data by executing face detection, priority determination, and assignment of tag data is available.

Second Embodiment

As described with respect to the first embodiment, the arrangement in which photographed image data is recorded while adding image reconstruction parameters to meta data. With respect to the second embodiment, an image reproducing apparatus is described which allows the user to browse image data which are recorded according to the first embodiment and can be reconstructed, and to perform editing operations for refocusing an image and changing an iris value. This embodiment will exemplify a case in which a PC having an interface shown in FIG. 11 displays and edits a reconstruction image by an application according to the flowchart shown in FIG. 10. Assume that image data to be reproduced is that obtained by photographing objects shown in FIG. 9A. As described in the first embodiment, this image is that appended as meta data of the image with a conversion matrix M1 which can reconstruct an image in which an object person is focused as the first place, as shown in FIG. 1. Likewise, this image data is appended, as the meta data of the image, with a conversion matrix M2 which can reconstruct an image in which an object vehicle is focused as the second place, and a conversion matrix M3 which can reconstruct an image in which an object building is focused as the third place.

Figure 10:
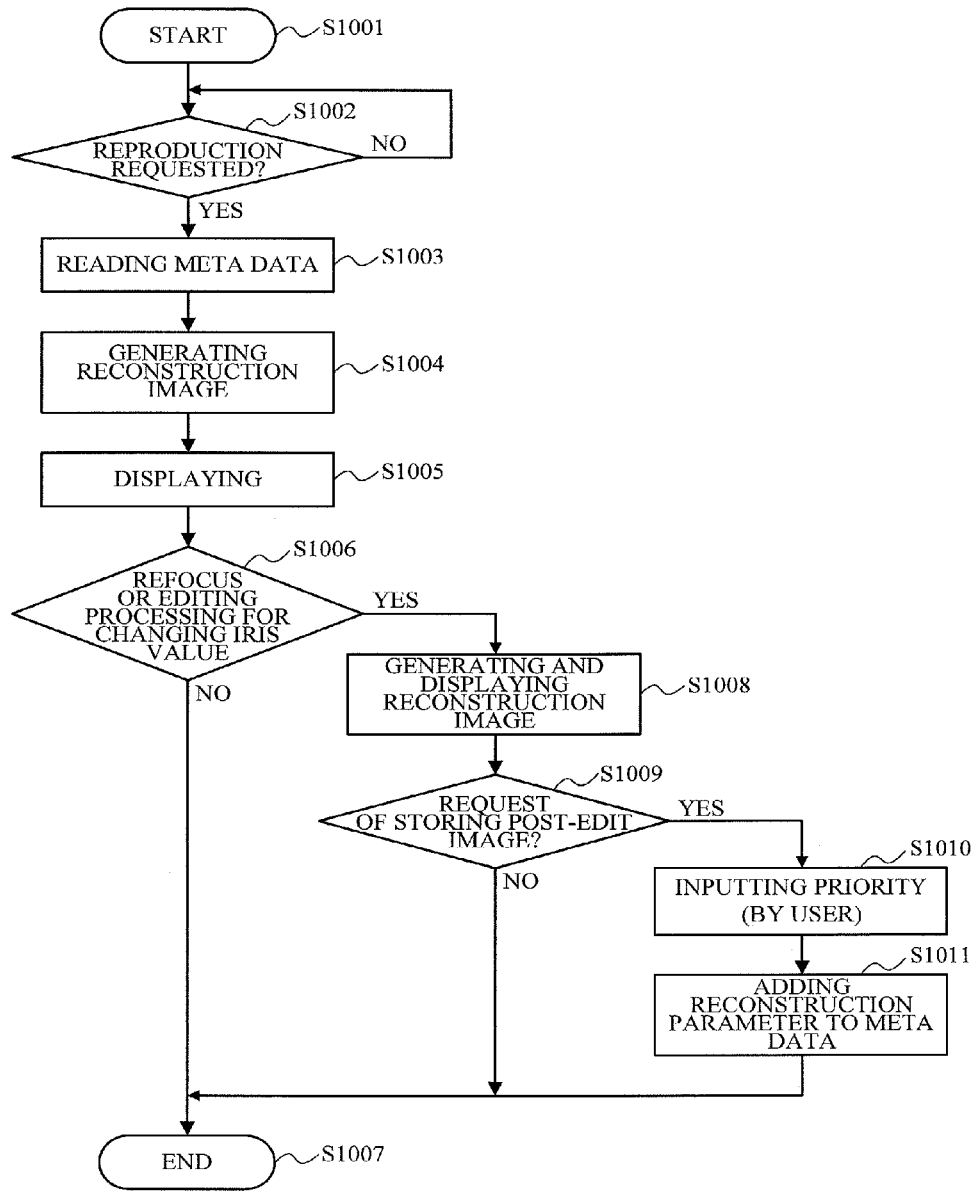
FIG. 10 is a flowchart of a reproducing operation of an image reproducing apparatus according to the second embodiment of the present invention.

FIG. 10 is a flowchart of an image reproducing operation according to the second embodiment. In this embodiment, as described above, this operation is attained when a CPU of the PC executes an application program to control respective units (for example, a display unit and the like) of the PC.

In step S1002, the control waits until the user inputs a reproduction request of image data which can be reconstructed. Then, when the reproduction request is input, the process advances to step S1003, and an image and its meta data corresponding to the reproduction request are obtained. In this case, the image data and meta data are those which are recorded by the recording apparatus according to the first embodiment, and are provided from the recording apparatus directly or via a detachable-type recording medium or the like.

Figure 11:
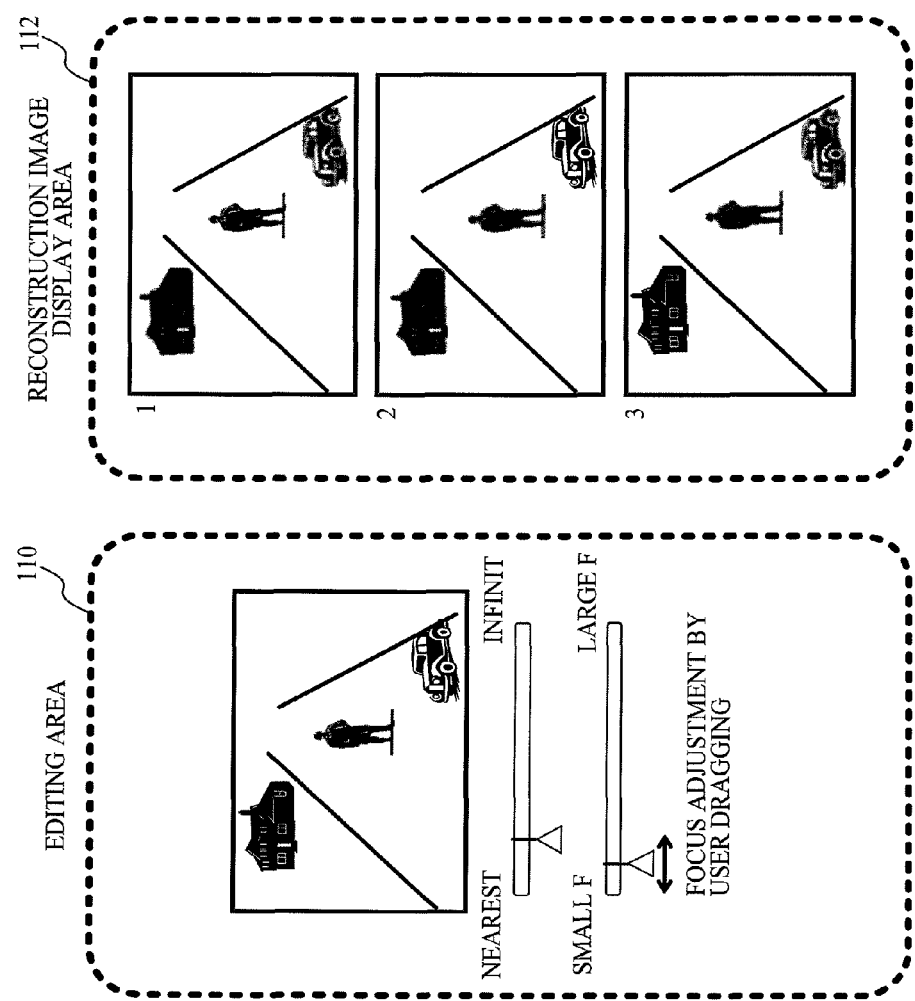
FIG. 11 is a view illustrating a display screen of a reproduced image in the image reproducing apparatus according to the second embodiment of the present invention.

The interface of the PC application shown in FIG. 11 is largely divided into right and left areas, and the right area is an area 112 for displaying a plurality of reconstruction images. In step S1003, reconstruction parameters in the meta data are read, and images which are reconstructed based on the read reconstruction parameters (conversion matrices M1, M2, and M3) are displayed in turn from the top in a priority order in steps S1004 and S1005. In this case, a reconstruction image in which a person as an object with the highest priority is displayed at an uppermost position on the right area of a screen, a reconstruction image in which a vehicle as an object with the priority of the second place is focused is displayed below that image, and a reconstruction image in which a building as an object with the priority of the third place is focused is displayed at a lowermost position. Note that when the number of reconstruction images which can be displayed on the reconstruction image display area 112 is limited to n (for n≥1) in terms of a display space of the screen, reconstruction images based on top n conversion matrices stored in meta data are displayed on the display area.

After the reconstruction images based on the reconstruction parameters stored in the meta data are displayed, the process advances to step S1006 to wait for an editing instruction for refocusing an image or changing an iris value from the user. If no editing instruction is received in this step, the process advances to step S1007 to end the sequence. On the other hand, if the editing instruction is received, the following operation is performed. That is, the left area of FIG. 11 is an editing area 110 which displays an image during editing. The editing area 110 displays a reproduced image and an interface used to edit a refocus plane and iris value. When the user drags two gauges to the right or left, he or she can instruct to change the refocus plane and iris value. Every time each gauge is operated, a conversion matrix required to generate a reconstruction image corresponding to the gauge is calculated, and a post-edit reconstruction image is generated and displayed in step S1008. Thus, an image which reflects user instructions can be displayed.

When the user edits the refocus plane and iris value and then wants to store post-edit reconstruction images, he or she issues a post-edit image storage instruction in step S1009. If the storage request is received, the control prompts the user to also input (set) priorities of the post-edit images, and conversion matrices generated in step S1008 are added to meta data of the image data in step S1011. At the same time, the post-edit images are displayed at positions according to the priorities on the reconstruction image display area 112 in FIG. 11, thus ending the operation of this embodiment.

For example, assume that a reconstruction image in which a person is focused, and which image is stored as the first place of the priority in the meta data at the beginning of image reproduction, is strictly an image in which ears of a person are focused. Then, assume that the user reconstructs an image in which eyes of a person are focused by editing, and stores this conversion matrix as the first place of the priority. In this case, since the reconstruction image in which the eyes of the person are focused is set as the first place of the priority, the priorities of reconstruction images originally stored in the meta data are shifted down one by one. As a result, the second place of the priority is the image in which the ears of the person are focused, the third place of the priority is the image in which the vehicle is focused, and the fourth place of the priority is the image in which the building is focused. Note that, when the user replaces an arranging order of images or deletes an image on the reconstruction image display area 112, the priorities may be changed. In this case, latest priorities are re-calculated in synchronism with the replacement or deletion, and reconstruction image generation conversion matrices written into the meta data are also rewritten in correspondence with the priorities after re-calculations.

Note that, in this embodiment, the reproducing and editing operations of image data by means of the application at the PC. However, an embodiment of the present invention is not limited to this. For example, a CPU of the photographing control unit 206 of the image pickup apparatus according to the first embodiment may execute a program to control respective units such as the display unit 207, thereby implementing a reproducing operation. Also, the present invention can also be implemented as an image processing function in an apparatus having a display function other than the PC.

According to the aforementioned first and second embodiments of the present invention, image data which can quickly be reconstructed and displayed as a refocus image in a desired focus state can be provided as recording data, and the possibility of efficient use of that image data can be extended.

Figure 12A:
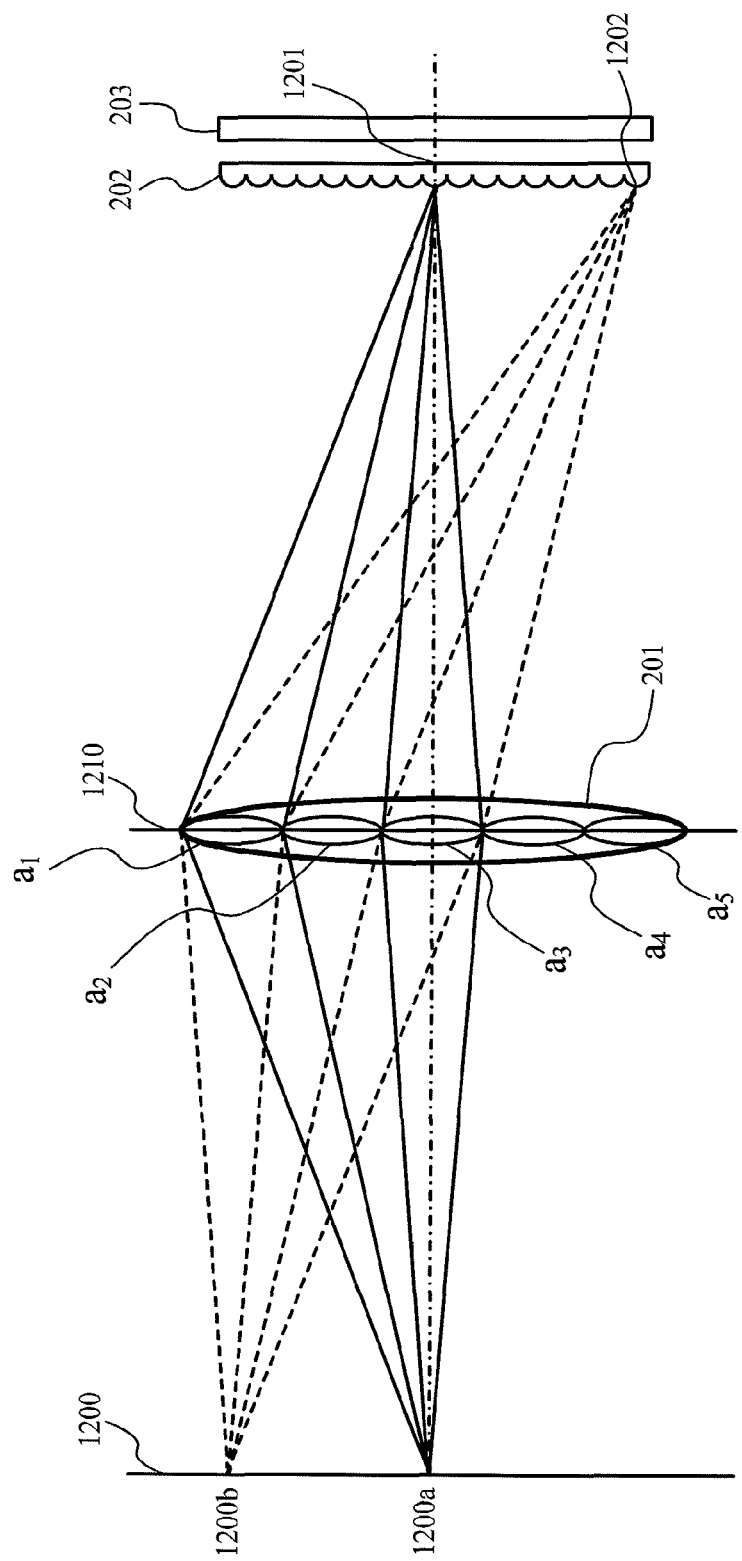
Figure 12B:
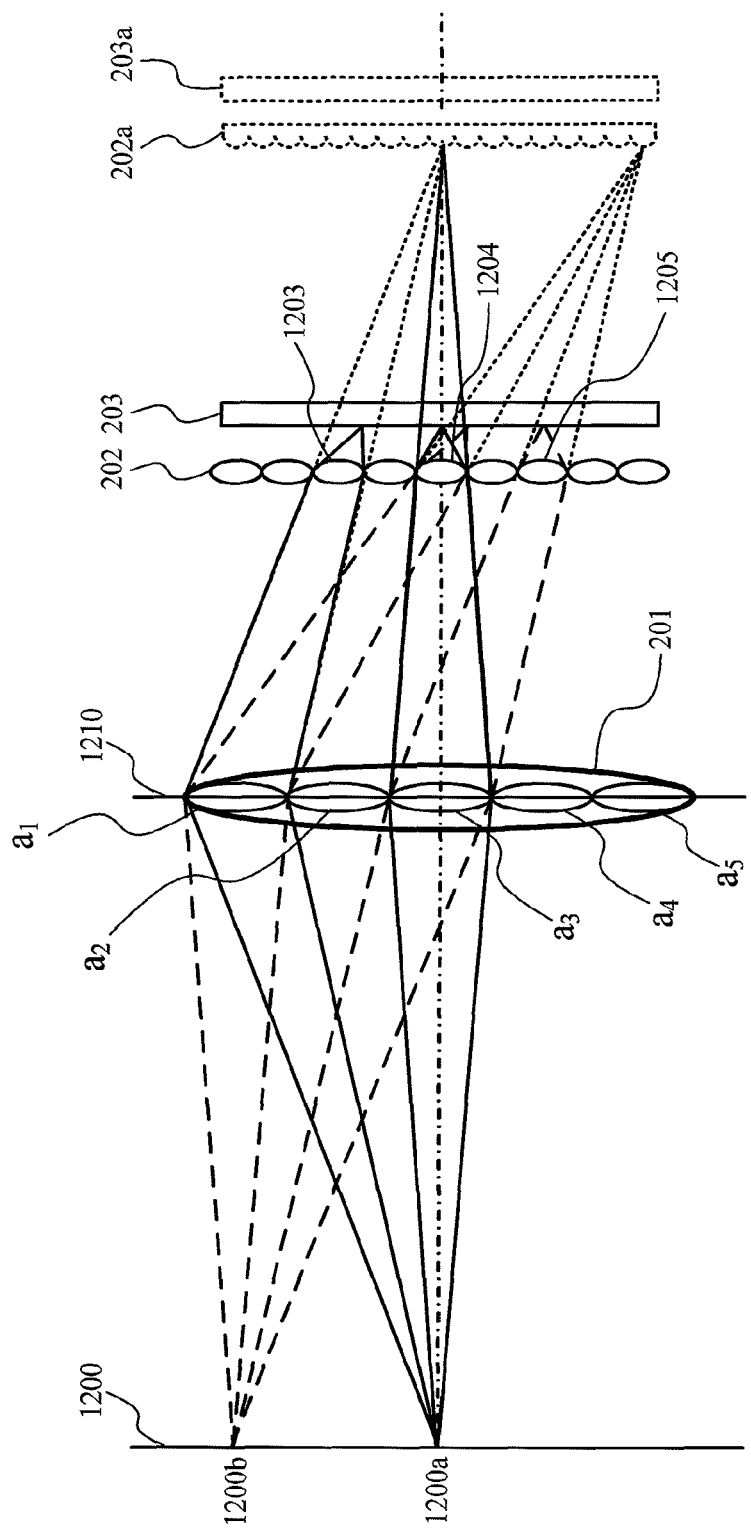

Examples of other optical systems applicable to this embodiment will be described below with reference to FIGS. 12A to 12C. FIGS. 12A to 12C illustrate a state in which rays of light coming from an object are focused onto the image pickup element 206. The example shown in FIG. 12A corresponds to the optical system described using FIGS. 2 to 4, and the MLA 202 is arranged in the neighborhood of a focus plane of the photographing optical system. FIG. 12B shows an example in which the MLA 202 is arranged at a position closer to an object than the focus plane of the photographing optical system. FIG. 12C shows an example in which the MLA 202 is arranged on a side farther from an object than the focus plane of the photographing optical system. In FIGS. 12A to 12C, the same reference numerals denote the same parts as those shown in the already described drawings.

In FIGS. 12A to 12C, reference numeral 1200 denotes an object plane; and 1200a and 1200b, appropriate points on an object. Reference symbols a1 to a5 denote areas of a pupil plane of the photographing optical system. Reference numerals 1201 to 1209 denote specific microlenses on the MLA 202. In FIGS. 12B and 12C, reference numeral 203a denotes a virtual image pickup element, and 202a denotes a virtual MLA. These are illustrated for the purpose of reference so as to clearly specify correspondence relationships with FIG. 12A. Also, rays of light exiting from the point 1200a on the object and then passing through the areas a1 and a3 on the pupil plane are illustrated by the solid lines, and rays of light exiting from the point 1200b on the object and then passing through the areas a1 and a3 on the pupil plane are illustrated by the broken lines.

In the example shown in FIG. 12A, since the MLA 202 is arranged in the neighborhood of the focus plane of the photographing optical system, the image pickup element 203 and a pupil plane 1210 of the photographing optical system have a conjugate relationship. Furthermore, the object plane 1200 and MLA 202 have a conjugate relationship. For this reason, rays of light exiting from the point 1200a on the object reach the microlens 1201, those exiting from the point 1200b reach the microlens 1202, and the rays of light respectively passing through the areas a1 to a5 respectively reach corresponding pixels arranged under the microlens.

In the example shown in FIG. 12B, rays of light coming from the photographing optical system are focused by the MLA 202, and the image pickup element 203 is arranged on that focus plane. With this arrangement, the object plane 1200 and image pickup element 203 have a conjugate relationship. Light exiting from the point 1200a on the object and then passing through the area a1 on the pupil plane reaches the microlens 1203, and light exiting from the point 1200a on the object and then passing through the area a3 on the pupil plane reaches the microlens 1204. Light exiting from the point 1200b on the object and then passing through the area a1 on the pupil plane reaches the microlens 1204, and light exiting from the point 1200b on the object and then passing through the area a3 on the pupil plane reaches the microlens 1205.

Rays of light passing through each microlens reaches corresponding pixels arranged under that microlens. In this manner, rays of light are respectively focused onto different positions depending on the points on the object and the passing areas on the pupil plane. When they are re-arranged on the virtual image pickup plane 203a, the same information as in FIG. 12A can be obtained. That is, information of the passing pupil areas (incidence angles) and positions on the image pickup element 203 can be obtained.

In the example of FIG. 12C, rays of light coming from the photographing optical system are re-converged by the MLA 202 (they are "re-converged" since once focused rays of light in a diffusing state are focused again), and the image pickup element 203 is arranged on its focus plane. With this arrangement, the object plane 1200 and image pickup element 203 have a conjugate relationship. Light exiting from the point 1200a on the object and then passing through the area a1 on the pupil plane reaches the microlens 1207, and light exiting from the point 1200a on the object and then passing through the area a3 on the pupil plane reaches the microlens 1206. Light exiting from the point 1200b on the object and then passing through the area a1 on the pupil plane reaches the microlens 1209, and light exiting from the point 1200b on the object and then passing through the area a3 on the pupil plane reaches the microlens 1208. Rays of light passing through each microlens reaches corresponding pixels arranged under that microlens. As in FIG. 12B, when they are re-arranged on the virtual image pickup plane 203a, the same information as in FIG. 12A can be obtained. That is, information of the passing pupil areas (incidence angles) and positions on the image pickup element can be obtained.

FIGS. 12A to 12C have exemplified the case in which the MLA (phase modulation element) is used as a pupil division unit to obtain position information and angle information. Alternatively, other optical arrangements may be used as long as position information and angle information (equivalent to restrictions of pupil passing areas) can be obtained. For example, a method of inserting a mask (gain modulation element) with an appropriate pattern into an optical path of the photographing optical system can also be used.

According to the present invention described above, a recording apparatus of image data which can quickly display a refocus image of a desired focus state and a reproducing apparatus of the recording data can be provided.

Other Embodiments

Embodiments of the present invention can also be realized by a computer of a system or an apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-136391, filed on Jun. 15, 2012, which is hereby incorporated by reference herein in its entirety.

What is claimed is:

1. An image reproducing apparatus for reproducing an image corresponding to image data, the image reproducing apparatus comprising:
   a memory that stores instructions; and
   one or more processors that execute the instructions to cause the image reproducing apparatus to function as:
      a generation unit configured to generate an image corresponding to a virtual diaphragm value by reconstructing the image data;
      a setting unit configured to set the virtual diaphragm value; and
      a display control unit configured to display, on a display, the image corresponding to the virtual diaphragm value generated by the generation unit,
   wherein the display control unit displays the image corresponding to the virtual diaphragm value and a graphical user interface for indicating the virtual diaphragm value of the image set by the setting unit, and
   wherein the display control unit displays images, of a plurality of images generated by the generation unit, together, and the plurality of images respectively correspond to a plurality of virtual diaphragm values.

2. The image reproducing apparatus according to claim 1, wherein the graphical user interface changes the virtual diaphragm value for instructing the setting unit according to a drag operation.

3. The image reproducing apparatus according to claim 2, wherein the generation unit generates an image corresponding to the changed virtual diaphragm value that is changed based on a distance of the drag operation, and
   the display control unit displays the image generated by the generation unit according to the distance of the drag operation.

4. The image reproducing apparatus according to claim 2, wherein the graphical user interface changes the virtual diaphragm value for instructing the setting unit by dragging a gauge on a displayed bar.

5. The image reproducing apparatus according to claim 4, wherein the displayed bar extends horizontally, right and left, with respect to the displayed image, and the diaphragm value is decreased as a position of the gauge is dragged to a left side.

6. The image reproducing apparatus according to claim 4, wherein the generation unit generates an image of the virtual diaphragm value corresponding to the gauge each time the drag operation occurs, and
   the display control unit displays the image of the virtual diaphragm value corresponding to the gauge generated by the generation unit.

7. The image reproducing apparatus according to claim 1, wherein the graphical user interface is displayed without overlapping the image.

8. The image reproducing apparatus according to claim 1, wherein the image data is image data picked up from a plurality of viewpoints.

9. The image reproducing apparatus according to claim 1, wherein the image data is image data picked up by an image pickup unit including a plurality of microlenses and a plurality of photoelectric converters arranged corresponding to each microlens.

10. The image reproducing apparatus according to claim 1, wherein the generation unit generates an image corresponding to the virtual diaphragm value by selectively using a pixel of the image data according to the virtual diaphragm value.

11. The image reproducing apparatus according to claim 1, wherein the image generated by the generation unit is an image focused on any one of a plurality of focusing positions including a focusing position that is different from a focusing position of the image data at a time of an image pickup.

12. The image reproducing apparatus according to claim 1, wherein the generation unit reconstructs the image data by combining and adding outputs from corresponding pixels decided by any one of a plurality of focusing positions and the virtual diaphragm value.

13. The image reproducing apparatus according to claim 1, wherein information of a diaphragm value of the image data at a time of an image pickup is included in meta data of the image data.

14. The image reproducing apparatus according to claim 1, wherein a defocus amount of an object in the image data is included in meta data of the image data.

15. The image reproducing apparatus according to claim 1, wherein the display control unit displays the plurality of images generated by the generation unit side by side in accordance with a priority order recorded together with image data used in a generation of the plurality of images.

16. A controlling method for an image reproducing apparatus for reproducing an image corresponding to image data, the controlling method comprising:
   a generating step of generating an image corresponding to a virtual diaphragm value by reconstructing the image data;
   a setting step of setting the virtual diaphragm value; and
   a displaying step of displaying the image corresponding to the virtual diaphragm value generated in the generating step,
   wherein in the displaying step, the image corresponding to the virtual diaphragm value and a graphical user interface for indicating the virtual diaphragm value of the image set in the setting step are displayed, and
   wherein in the displaying step, images of a plurality of images generated in the generating step are displayed together, and the plurality of images respectively correspond to a plurality of virtual diaphragm values.

17. A non-transitory computer-readable storage medium storing a program for causing a computer to execute a controlling method for an image reproducing apparatus for reproducing an image corresponding to image data, the controlling method comprising:
- a generating step of generating an image corresponding to a virtual diaphragm value by reconstructing image data;
- a setting step of setting the virtual diaphragm value; and
- a displaying step of displaying the image corresponding to the virtual diaphragm value generated in the generating step,
- wherein in the displaying step, the image corresponding to the virtual diaphragm value and a graphical user interface for indicating the virtual diaphragm value of the image set in the setting are displayed, and
- wherein in the displaying step, images of a plurality of images generated in the generating step are displayed together, and the plurality of images respectively correspond to a plurality of virtual diaphragm values.

* * * * *